May 30, 1939.     G. KELLNER     2,160,617
PROCESS FOR CLOSING COLLAPSIBLE TUBES BY WELDING
Filed April 20, 1936
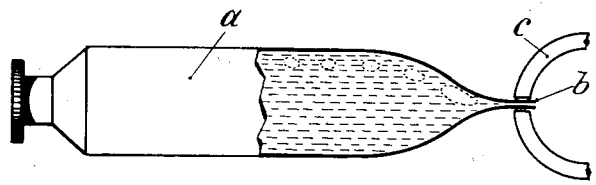
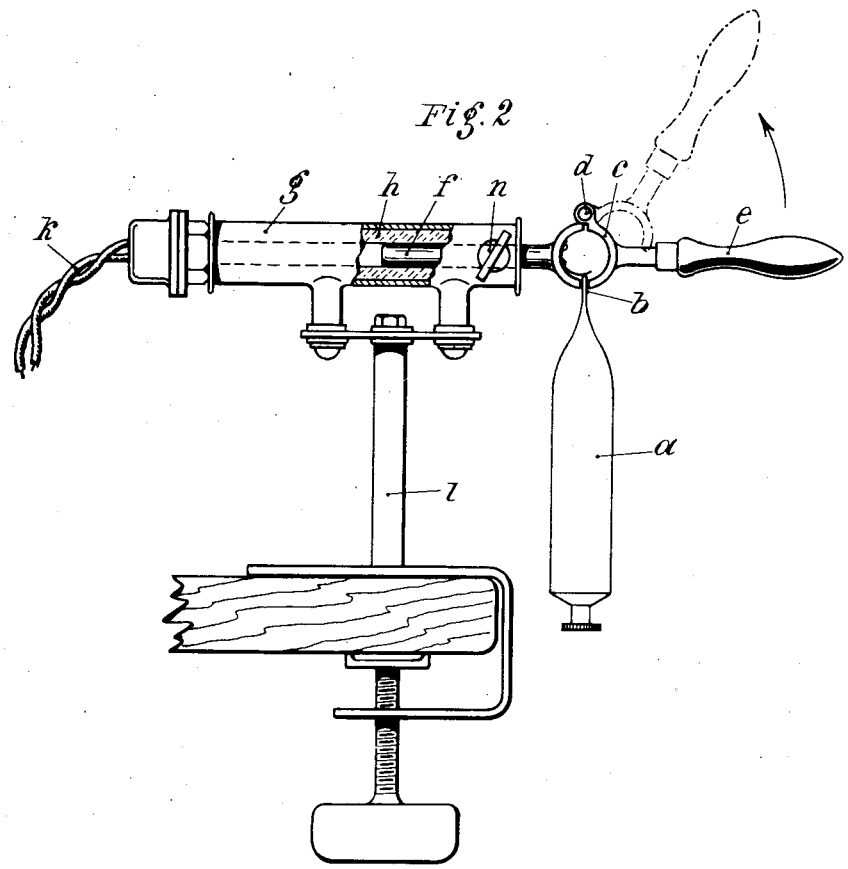
Gustav Kellner
Inventor
by
Attorney Patented May 30, 1939

2,160,617

UNITED STATES PATENT OFFICE 2,160,617

PROCESS FOR CLOSING COLLAPSIBLE TUBES BY WELDING

Gustav Kellner, Munich, Germany, assignor to Erhard Zacharias, New York, N. Y.

Application April 20, 1936, Serial No. 75,304

1 Claim. (Cl. 113—121)

The present invention relates to a process for closing collapsible tubes by welding, resulting on the one hand in a reliable closure of the folded end of the filled tube and on the other hand in thorough mixing of the contents when the latter are in liquid form.

Reference being had to the accompanying drawing, Fig. 1 illustrates the operation of the process and Fig. 2 the device for executing said process, $a$ being a filled tube, $b$ the fold at the end of the tube and $c$ the welding tool.

According to the present invention, the temperature during welding is increased to about 200° C., or the period of welding is increased, so that the liquid or air in the tube nearest the folded end is vaporized or expanded, the tube being held head downwards during the operation of welding. The gas thus generated streams in the form of bubbles through the length of the tube and causes a thorough mixing or stirring of the entire liquid contents. During their motion through the tube the bubbles come into contact with the cold liquid in the tube and are again condensed and finally mix with the contents. By this means the entire liquid in the tube is warmed up, this resulting in a refinement of perfume in the case of cosmetics and the like as well as in a compensation of any loss of aroma ensuing during the filling operation. Further, this vaporization at the same time serves as a test of the tightness of the tube containing cosmetics able to generate a gas or vapor when being heated to an appropriately high temperature by creating a small overpressure, in itself not great enough to damage the tube, but yet great enough to cause a slight but visible distension of the tube end nearest the fold. This distension is a sure sign of the commencement of the vaporization process and provides the operator with a means to gauge the necessary duration of the procedure. The conclusion of the heating process, in the case of thin liquids, is also indicated by the bubbles in the interior of the tube causing an audible gurgling noise and further, the operator can, by holding the end of the tube between two fingers, directly feel the progress of the internal procedure; the above distension of the tube end as well as the slight vibration of the tube body when the bubbles stream through the liquid can be clearly felt, so that an overheating and consequent melting of the folded end, as also an inadmissible vaporization can be reliably avoided.

Fig. 2 shows a welding device adapted for the execution of the process according to the present invention in side view and partial section. The tool $c$ for closing the folded end $b$ of tube $a$ consists of a cylindrical clamp, the two halves of which are hinged together at $d$. The one half is provided wtih a handle $e$ for opening and closing the tool and the other half with a rod $f$ of heat conducting material.

Rod $f$ is slidingly arranged in the electrical heating body $g$, consisting, for instance, of a hollow cylinder containing the heating element $h$ of known construction, said heating element having a central hole conforming to the rod $f$. The wire $k$ connects the apparatus to the current supply. The entire heating device is suitably mounted on a stand $l$, which can for instance be adapted to screw to a table or work bench. Set screw $n$ serves to fix rod $f$ in place in the heating body $g$.

This device has the advantage that the amount of heat necessary for welding and for part vaporization of the contents of the tube can be easily and accurately regulated according to the material of the tube or the condition of the contents or the size of the folded end. The necessary temperature will vary according to the thickness of the tube walls and according to the material employed (tin, lead, etc.). By varying the extent to which rod $f$ is pushed into the heating body $g$, the amount of heat transmitted to the welding tool $c$ can be regulated at will. One and the same apparatus can be employed for all types and sizes of tubes as well as for any kind of tube material. A special advantage of the device is the ease of adjustment by a single grip. There is no danger that the vapor generated at the top of the tube will remain stationary rather than pass to the bottom and cause a mixing of the contents. The gas pressure which is developed by the heat of the welding or fusing process is sufficiently high to enable the developed bubbles to penetrate the contents of a tube in each position of the tube.

The welding device according to Fig. 2 can be used not only for welding tubes with liquid contents, but also for welding tubes containing cream, ointment, paste and similar viscous substances.

What I claim as my invention is:

A method of closing the foot end of the filled collapsible tubes containing cosmetics able to generate a gas or vapor when being heated to an appropriately high temperature, said method comprising transforming the foot end of the tube into flat shape so that the opposite wall portions are in direct contact with each other, and applying to said flat end pressure and such an amount of heat that not only said wall portions are welded or fused together but also the said end is distended by the gas or vapor evolved by the heated contents of the tube and a gurgling noise indicates that said gas or vapor is penetrating the tube contents and is mixing the components with each other, whereafter the heating is discontinued.

GUSTAV KELLNER.